United States Patent
Zhou et al.

(10) Patent No.: US 10,451,910 B2
(45) Date of Patent: Oct. 22, 2019

(54) LIQUID CRYSTAL DISPLAY DEVICE AND DRIVING METHOD THEREOF

(71) Applicant: JIANGSU HECHENG DISPLAY TECHNOLOGY CO., LTD., Yangzhong, Jiangsu (CN)

(72) Inventors: Zhenting Zhou, Yangzhong (CN); Panpan Wang, Yangzhong (CN); Zhaoyuan Chen, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 270 days.

(21) Appl. No.: 15/542,586

(22) PCT Filed: Jan. 8, 2016

(86) PCT No.: PCT/CN2016/070524
§ 371 (c)(1),
(2) Date: Jul. 10, 2017

(87) PCT Pub. No.: WO2016/110274
PCT Pub. Date: Jul. 14, 2016

(65) Prior Publication Data
US 2017/0363889 A1   Dec. 21, 2017

(30) Foreign Application Priority Data
Jan. 8, 2015  (CN) .......................... 2015 1 0010263

(51) Int. Cl.
*G02F 1/1334* (2006.01)
*G02F 1/139* (2006.01)
(Continued)

(52) U.S. Cl.
CPC ............ *G02F 1/1334* (2013.01); *G02F 1/132* (2013.01); *G02F 1/137* (2013.01); *G02F 1/1391* (2013.01);
(Continued)

(58) Field of Classification Search
CPC .. G02F 1/132; G02F 1/133305; G02F 1/1334; G02F 1/133553; G02F 1/13439;
(Continued)

(56) References Cited

U.S. PATENT DOCUMENTS 5,216,530 A    6/1993  Pearlman et al.
5,223,959 A *  6/1993  Wu ...................... C09K 19/544
                                                         349/165
(Continued)

FOREIGN PATENT DOCUMENTS

CN    101644845 A    2/2010
CN    101794043 A    8/2010
(Continued)

*Primary Examiner* — Sophie Hon
(74) *Attorney, Agent, or Firm* — Hoffmann & Baron, LLP

(57) ABSTRACT

A liquid crystal display device, being widely used in the fields such as electronic tags, electronic papers, business cards and flexible display screens or the like, and a driving method for the liquid crystal display device. The liquid crystal display device has an upper substrate, a lower substrate and one or more layers of an encapsulated liquid crystal sandwiched between the upper substrate and the lower substrate. The layers of the encapsulated liquid crystal include two different liquid crystal microcapsules uniformly mixed. Combined with a driving method of a combination of high-low voltage and high-low temperature, a color display effect of high contrast and repeatable writing can be achieved.

16 Claims, 8 Drawing Sheets

(51) Int. Cl.
*G02F 1/137* (2006.01)
*G02F 1/13* (2006.01)
*G02F 1/1333* (2006.01)
*G02F 1/1335* (2006.01)
*G02F 1/1343* (2006.01)

(52) U.S. Cl.
CPC ...... *G02F 1/13439* (2013.01); *G02F 1/13725* (2013.01); *G02F 1/133305* (2013.01); *G02F 1/133553* (2013.01); *G02F 2202/043* (2013.01); *Y10T 428/1041* (2015.01)

(58) Field of Classification Search
CPC ................. G02F 1/137; G02F 1/13725; G02F 2202/043; Y10T 428/1041
See application file for complete search history.

(56) References Cited

U.S. PATENT DOCUMENTS

| 7,348,044 | B2 | 3/2008 | Takaku et al. | |
|---|---|---|---|---|
| 2002/0084442 | A1* | 7/2002 | Yasuda | G02F 1/13725 |
| | | | | 252/299.01 |
| 2002/0135860 | A1 | 9/2002 | Iwanaga et al. | |
| 2004/0119911 | A1* | 6/2004 | Ooae | G02F 1/1334 |
| | | | | 349/86 |
| 2007/0109476 | A1 | 5/2007 | Liao et al. | |
| 2007/0278449 | A1 | 12/2007 | Takaku et al. | |
| 2008/0011983 | A1* | 1/2008 | Lee | C09K 19/52 |
| | | | | 252/299.01 |
| 2010/0003883 | A1 | 1/2010 | Lee et al. | |
| 2010/0151228 | A1 | 6/2010 | Chin et al. | |
| 2012/0242943 | A1 | 9/2012 | Sun et al. | |
| 2014/0085574 | A1 | 3/2014 | Kashima et al. | |
| 2014/0184984 | A1 | 7/2014 | Kim et al. | |
| 2014/0226096 | A1* | 8/2014 | Taheri | G02F 1/13306 |
| | | | | 349/33 |

FOREIGN PATENT DOCUMENTS

| CN | 103913880 A | | 7/2014 |
|---|---|---|---|
| CN | 104267523 A | | 1/2015 |
| JP | S6248789 A | | 3/1987 |
| JP | 62156193 A | * | 7/1987 |
| JP | H06123881 A | | 5/1994 |
| JP | H0980401 A | | 3/1997 |
| JP | 2000147479 A | | 5/2000 |
| JP | 2001296520 A | * | 10/2001 |
| JP | 2006306926 A | | 11/2006 |
| JP | 2013541051 A | | 11/2013 |
| KR | 1020110091358 A | | 8/2011 |
| TW | 200521545 A | | 7/2005 |

* cited by examiner

LIQUID CRYSTAL DISPLAY DEVICE AND DRIVING METHOD THEREOF

FIELD OF THE INVENTION

The present invention relates to the field of display technology, in particular, to a liquid crystal display device and driving method thereof.

BACKGROUND OF THE INVENTION

Bistable electronic paper technology mainly comprises two categories which are particle moving electronic paper technology and bistable liquid crystal display technology. The mainstream of particle moving electronic paper technology is microcapsule electrophoresis display technology, but the movement speed of the particles in the microcapsules is relatively slow, affecting the page turning and switching speed of the electronic paper based on the microcapsule electrophoresis display technology. Liquid crystal molecules are smaller than particles in microcapsules and can be rotated rapidly under the action of electric field. Therefore, developing bistable liquid crystal microcapsules is an important direction for the development of bistable electronic paper technology.

At present, the mass-produced electronic paper display panel module is mainly monochrome B/W display, while color digital content needs full color display, so color display is an important issue of the development of future electronic paper. Based on the future development trend of flexible display, the development of color flexible electronic paper display device is an issue that the display field faces.

The conventional smectic phase liquid crystal display device is composed of a two or three layers of liquid crystal to realize the color display effect, such as the display device disclosed in the invention patent CN101644845A is composed of three kinds of layers of liquid crystal, the dichroic dyes added in each layer structure are different, the three layers are superposed on each other and disposed on a white reflector to achieve the display of multiple colors. The technology described in the invention patent has complicated process, large loss of incident light due to the multi-layer structure, poor color display effect, and cannot realize the flexible display.

SUMMARY OF THE INVENTION

In view of this, in order to overcome the above or other deficiencies in the prior art, the present invention provides a liquid crystal display device and a driving method thereof. The liquid crystal display device uses two different liquid crystal microcapsules mixed, and uses the differences in driving voltage and temperature between the two liquid crystal microcapsules with the combination of high-low voltage and high-low temperature to achieve a color display effect of high contrast and repetable writing.

In one aspect, the present invention provides a liquid crystal display device, comprising: an upper substrate and a lower substrate, one or more layers of an encapsulated liquid crystal sandwiched between the upper substrate and the lower substrate, and a first transparent electrode and a second transparent electrode disposed on the sides of the upper and lower substrates, in which each of the sides of the upper and lower substrates is adjacent to the liquid crystal layer, the first and second transparent electrodes are opposed to each other to compose a display area, wherein: the layers of the encapsulated liquid crystal comprise a first liquid crystal microcapsule and a second liquid crystal microcapsule uniformly distributed, the first liquid crystal microcapsule comprises a first liquid crystal material which comprises a smectic liquid crystal, a conductive material and a first dye; the second liquid crystal microcapsule comprises a second liquid crystal material which comprises a smectic liquid crystal, a nematic liquid crystal and a conductive material and a second dye.

The addition of a small amount of nematic liquid crystal in the smectic liquid crystal liquid can reduce the viscosity of the smectic liquid crystal, so that the temperature of the clear point of the second liquid crystal material refreshing into a transparent state is lower than the temperature of the clear point of the first liquid crystal material, and the voltage value of the second liquid crystal material refreshing into a misty state is lower than the voltage of the first liquid crystal material refreshing into a misty state.

Further, the first dye comprises one or more dichroic dyes, the second dye comprises one or more dichroic dyes, and the first dye and the second dye are different in color.

Further, the conductive material is a mixture of any one or any of inorganic nanoparticles, carbon nanotubes, graphene, sodium carbonate, cetyltriethylammonium bromide, ethyltriphenylphosphonium iodide, (ferrocenylmethyl)trimethylammonium iodide, 1,2-dimethyl-3-butylimidazolium hexafluorophosphate, tetraethylammonium p-toluenesulfonate, phenyltriethylammonium iodide, 1-octyl-3-methylimidazolium hexafluorophosphate, bis(tetra-n-butylammonium) bis(1,3-dithiole-2-thione-4,5-dithiolato)palladium (II), tetra-n-butylphosphonium bis(1,3-dithiole-2-thione-4,5-dithiolato)nickel(III), bis(tetra-n-butylammonium) bis(1,3-dithiole-2-thione-4,5-dithiolato)zinc, bis(tetra-n-butylammonium) tetracyanodiphenoquinodimethane, tetrabutylammonium bromide, cetylammonium perchlorate, tetracetylammonium bromide, 1-butyl-3-methylimidazolium tetrachloroferrate, methyltriphenylphosphonium iodide or tetraphenylphosphonium iodide having conductive properties.

Further, the first liquid crystal material comprises the conductive material in an amount of 0.001%-10% and the first dye in an amount of 0.01-10% added to the smectic liquid crystal.

Further, the second liquid crystal material comprises the nematic liquid crystal in an amount of 1%-20%, the conductive material in an amount of 0.001%-10% and the second dye in an amount of 0.01-10% added to the smectic liquid crystal.

Further, the layers of the encapsulated liquid crystal further comprise a gel material which comprises a UV glue, an animal glue, a plant gum, a microbial gum, polyvinyl alcohol or a combination thereof.

Further, the liquid crystal display device further comprises a reflector disposed on either side of the lower substrate, the color of the reflector is different from the color of the first dye, the color of the second dye and the color of the mixture of the first and the second dyes.

Alternatively, both of the upper substrate and the lower substrate are transparent flexible plastic film or glass.

As another embodiment, the upper substrate is transparent flexible plastic film or glass, the lower substrate is flexible reflective material, and the color of the reflective material is different from the color of the first dye, the color of the second dye and the color of the mixture of the first and the second dyes.

In one aspect, the present invention provides a method for driving the above-mentioned liquid crystal display device, comprising: applying sequentially a first voltage, a first temperature, a second voltage, and a second temperature, wherein the first and the second voltages are applied between the first and the second transparent electrodes, and the first and the second temperatures are applied to the whole area or the partial area of the display area by heating.

Further, a display area with a first color is configured by applying the first voltage, not applying the first temperature, applying the second voltage and applying the second temperature.

Further, a display area with a second color is configured by applying the first voltage, applying the first temperature, applying the second voltage and not applying the second temperature.

Further, a display area with a third color is configured by applying the first voltage, not applying the first temperature, applying the second voltage, and not applying the second temperature.

Further, a display area with a fourth color is configured by applying the first voltage, applying the first temperature, applying the second voltage, and applying the second temperature.

The display areas with the first, second, third and fourth colors all include the first microcapsule and the second microcapsule uniformly distributed therein. The alignments of liquid crystal material in the microcapsules in different areas are changed by different driving methods to achieve different color display.

Being compared with the prior art, the present invention has the advantages that: the liquid crystal display device of the present invention is characterized in that one or more layers of an encapsulated liquid crystal are sandwiched by the upper and the lower substrate, and two different liquid crystal microcapsules are uniformly distributed in the layers of the encapsulated liquid crystal, and multistable color display effect can be achieved by combining the driving method of a combination of high-low voltage and high-low temperature.

In order to make the above-mentioned and other objects, characteristics and advantages of the present invention more apparent and understood, the preferred examples are described below in detail with reference to the Figures.

BRIEF DESCRIPTION OF DRAWING REFERENCE SIGNS

Figure 1:
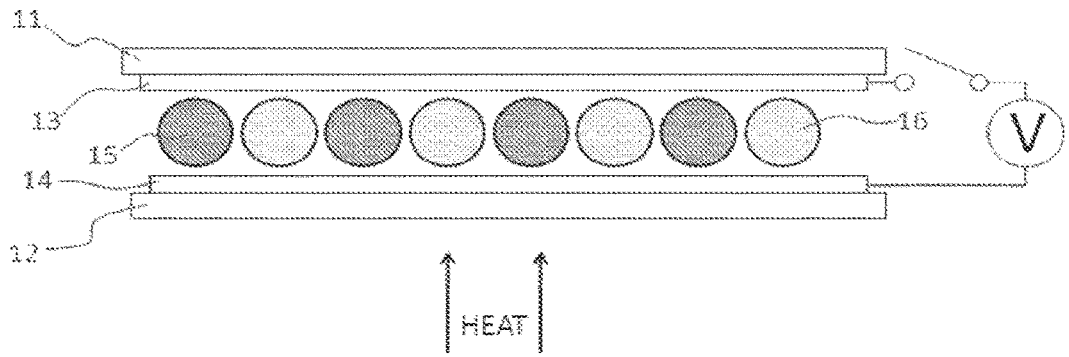
FIG. 1 is a schematic illustration of the cross-sectional view of a liquid crystal display device in one example of the present invention.

11 the upper substrate
12 the lower substrate
13 the first transparent electrode
14 the second transparent electrode
15 the first liquid crystal microcapsule layer
16 the second liquid crystal microcapsule
17 the walls of microcapsule
18 smectic liquid crystal
19 conductive material
20 the first dye
21 the second dye
22 nematic liquid crystal

DETAILED DESCRIPTION OF THE INVENTION

In the following description, in order to explain the description, numerous specific details are set forth so as to provide a comprehensive understanding of the present invention. In obvious, however, the present invention can be realized without these specific details. In other conditions, the known structures and devices are shown in the form of block diagram to avoid unnecessary misunderstanding of the present invention.

The present invention provides a liquid crystal display device, comprising: an upper substrate and a lower substrate, one or more layers of an encapsulated liquid crystal sandwiched between the upper substrate and the lower substrate, and a first transparent electrode and a second transparent electrode disposed on the sides of the upper and lower substrates, in which each of the sides of the upper and lower substrates is adjacent to the liquid crystal layer, the first and second transparent electrodes are planar electrodes and are opposed to each other to compose a display area. The layers of the encapsulated liquid crystal comprise a first liquid crystal microcapsule and a second liquid crystal microcapsule; the first and the second liquid crystal microcapsules are uniformly mixed in a certain ratio.

The layers of the first liquid crystal microcapsule comprise a first liquid crystal material which comprises the conductive material added to the smectic liquid crystal.

The layers of the second liquid crystal microcapsule comprise a second liquid crystal material which comprises a small amount of the nematic liquid crystal and the conductive material sequentially added to the smectic liquid crystal.

The first dye, which comprises one or more dichroic dyes, is added to the first liquid crystal material; preferably, the first dye comprises 0.001% to 10% by weight of the first liquid crystal material. The second dye, which comprises one or more dichroic dyes, is added to the second liquid crystal material; preferably, the second dye comprises 0.001% to 10% by weight of the second liquid crystal material. The first dye and the second dye are different in color.

The conductive material is a mixture of any one or any of inorganic nanoparticles, carbon nanotubes, graphene, sodium carbonate, cetyltriethylammonium bromide, ethyltriphenylphosphonium iodide, (ferrocenylmethyl)trimethylammonium iodide, 1,2-dimethyl-3-butylimidazolium hexafluorophosphate, tetraethylammonium p-toluenesulfonate, phenyltriethylammonium iodide, 1-octyl-3-methylimidazolium hexafluorophosphate, bis(tetra-n-butylammonium) bis(1,3-dithiole-2-thione-4,5-dithiolato)palladium (II), tetra-n-butylphosphonium bis(1,3-dithiole-2-thione-4,5-dithiolato)nickel(III), bis(tetra-n-butylammonium) bis(1,3-dithiole-2-thione-4,5-dithiolato)zinc, bis(tetra-n-butylammonium) tetracyanodiphenoquinodimethane, tetrabutylammonium bromide, cetylammonium perchlorate, tetracetylammonium bromide, 1-butyl-3-methylimidazolium tetrachloroferrate, methyltriphenylphosphonium iodide or tetraphenylphosphonium iodide having conductive properties.

The layers of the encapsulated liquid crystal further comprise a gel material which comprises a UV glue, an animal glue, a plant gum, a microbial gum, polyvinyl alcohol or a combination thereof.

The backplane is reflective whose color is different from the color of the first dye, the color of the second dye and the color of the mixture of the first and the second dyes; the backplane may preferably be a white reflector, which is disposed on the outer side of the lower substrate, and alternatively is disposed on the inner side of the lower substrate.

Both of the upper substrate and the lower substrate are transparent flexible plastic film or glass.

As an improvement, the present invention may also be selected not to dispose the above-mentioned backplane, the upper substrate is transparent flexible plastic film or glass, the lower substrate uses a flexible reflective material directly whose color is different from the color of the first dye, the color of the second dye, and the color of the mixture of the first and the second dyes.

The liquid crystal display device provided by the present invention is a display device based on a reflective microcapsule structure, and has the advantages of achieving high contrast color flexible display and can be widely used in the fields of electronic tags, business cards and flexible display screens or the like.

The method for driving the liquid crystal display device is the sequential applications of a first voltage, a first temperature, a second voltage and a second temperature, in which the first and the second voltages are applied between the first and the second transparent electrodes, and the first and the second temperatures are applied to the whole area or the partial area of the display area by heating. The color flexible display with one to four colors can be achieved by combining different temperatures and voltages.

The corresponding driving method of the display area with the first color, in turn, is applying the first voltage, not applying the first temperature, applying the second voltage, and applying the second temperature.

After the first voltage is applied between the first and the second transparent electrodes of the liquid crystal display device, since the conductive material is added to the liquid crystal material, the conductive material rotates under the action of the electric field, and thereby accelerate the twisting of the smectic liquid crystal molecules, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color. After the second voltage is applied between the first and the second transparent electrodes of the liquid crystal display device, since the conductive material is added to the liquid crystal material inside the second liquid crystal microcapsule, the conductive material rotates under the action of the electric field, and thereby accelerate the twisting of the smectic liquid crystal molecules inside the second liquid crystal microcapsule, and results in the dichroic dye molecules configured randomly. Since the first voltage of the first liquid crystal material refreshing into a misty state is higher than the second voltage of the second liquid crystal material refreshing into a misty state, the misty state of the first liquid crystal material at this time maintains.

After the second temperature is applied to the surface of the display area with the first color, since the first temperature of the first liquid crystal material refreshing into a transparent state is higher than the second temperature of the second liquid crystal material refreshing into a transparent state, the second temperature can only work for the second liquid crystal material, i.e. the second liquid crystal microcapsule. The second temperature causes the long axes of the liquid crystal molecules and the dichroic dye molecules in the second liquid crystal microcapsule to be parallel to the electrode surface, and the dichroic dye molecules absorb only minute light, therefore when the incident light passes through the dichroic dye molecules, only a small amount of light is absorbed, finally, the incident light is transmitted to the reflective material freely and then is reflected out, and the macro presents full transparent color. Due to the property of the smectic liquid crystal, the liquid crystal molecules maintain a transparent state after the heating is stopped.

Finally, the first liquid crystal microcapsule of the display area with the first color presents a misty state and the second liquid crystal microcapsule presents a transparent state.

The corresponding driving method of the display area with the second color, in turn, is applying the first voltage, applying the first temperature, applying the second voltage, and not applying the second temperature.

After the first voltage is applied between the first and the second transparent electrodes of the liquid crystal display device, since the conductive material is added to the liquid crystal material, the conductive material rotates under the action of the electric field, and thereby accelerate the twisting of the smectic liquid crystal molecules, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color.

After the first temperature is applied to the surface of the display area with the second color, the long axes of the liquid crystal molecules and the dichroic dye molecules in the liquid crystal microcapsules are parallel to the electrode surface, and the dichroic dye molecules absorb only minute light, and therefore when the incident light passes through the dichroic dye molecules, only a small amount of light is absorbed, finally, the incident light is transmitted to the reflective material freely and then is reflected out, the macro presents full transparent color. Due to the property of the smectic liquid crystal, the liquid crystal molecules maintain a transparent state after the heating is stopped.

After the second voltage is applied between the first and the second transparent electrodes of the liquid crystal display device, since the conductive material is added to the liquid crystal material inside the second liquid crystal microcapsule, the conductive material rotates under the action of the electric field, and thereby accelerates the twisting of the smectic liquid crystal molecules inside the second liquid crystal microcapsule, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color. The misty state of the layers of the liquid crystal microcapsule can maintain after withdrawal of the voltage. Since the first voltage of the first liquid crystal material refreshing into a misty state is higher than the second voltage of the second liquid crystal material refreshing into a misty state, the transparent state of the first liquid crystal microcapsule at this time maintains.

Finally, the first liquid crystal microcapsule of the display area with the second color presents a transparent state and the second liquid crystal microcapsule presents a misty state.

The corresponding driving method of the display area with the third color, in turn, is applying the first voltage, not applying the first temperature, applying the second voltage, and not applying the second temperature.

After the first voltage is applied between the first and the second transparent electrodes of the liquid crystal display device, since the conductive material is added to the liquid crystal material, the conductive material rotates under the action of the electric field, and thereby accelerates the twisting of the smectic liquid crystal molecules, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color.

After the second voltage is applied between the first and the second transparent electrodes of the liquid crystal display device, since the conductive material is added to the liquid crystal material inside the second liquid crystal microcapsule, the conductive material rotates under the action of the electric field, and thereby accelerates the twisting of the smectic liquid crystal molecules inside the second liquid crystal microcapsule, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color. The misty state of the layers of the liquid crystal microcapsule can maintains after withdrawal of the voltage. Since the first voltage of the first liquid crystal material refreshing into a misty state is higher than the second voltage of the second liquid crystal material refreshing into a misty state, the misty state of the first liquid crystal microcapsule at this time maintains.

Finally, the first liquid crystal microcapsule of the display area with the third color presents a misty state and the second liquid crystal microcapsule presents a misty state.

The corresponding driving method of the display area with the fourth color, in turn, is applying the first voltage, applying the first temperature, applying the second voltage, and applying the second temperature.

After the first voltage is applied between the first and the second transparent electrodes of the liquid crystal display device, since the conductive material is added to the liquid crystal material, the conductive material rotates under the action of the electric field, and thereby accelerates the twisting of the smectic liquid crystal molecules, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color.

After the first temperature is applied to the surface of the display area with the second color, the long axes of the liquid crystal molecules and the dichroic dye molecules in the liquid crystal microcapsules are parallel to the electrode surface, and the dichroic dye molecules absorb only minute light, and therefore when the incident light passes through the dichroic dye molecules, only a small amount of light is absorbed, finally, the incident light is transmitted to the reflective material freely and then is reflected out, the macro presents full transparent color. Due to the property of the smectic liquid crystal, the liquid crystal molecules maintain a transparent state after the heating is stopped. After the second voltage is applied between the first and the second transparent electrodes of the liquid crystal display device, since the conductive material is added to the liquid crystal material inside the second liquid crystal microcapsule, the conductive material rotates under the action of the electric field, and thereby accelerates the twisting of the smectic liquid crystal molecules inside the second liquid crystal microcapsule, and results in the dichroic dye molecules configured randomly. Due to the birefringence of the smectic liquid crystal molecules, the incident light scatterings strongly after the incidence, and a certain band of light is absorbed by the dichroic dye molecules, the scattered light presents the color of the dichroic dye molecules, and the macro presents a certain color. The misty state of the layers of the liquid crystal microcapsule can maintain after withdrawal of the voltage. Since the first voltage of the first liquid crystal material refreshing into a misty state is higher than the second voltage of the second liquid crystal material refreshing into a misty state, the transparent state of the first liquid crystal microcapsule at this time is maintained.

After the second temperature is applied to the surface of the display area with the first color, since the first temperature of the first liquid crystal material refreshing into a transparent state is higher than the second temperature of the second liquid crystal material refreshing into a transparent state, the second temperature can only work for the second liquid crystal material, i.e. the second liquid crystal microcapsules. The second temperature causes the long axes of the liquid crystal molecules and the dichroic dye molecules in the second liquid crystal microcapsules to be parallel to the electrode surface, and the dichroic dye molecules absorb only minute light, and therefore when the incident light passes through the dichroic dye molecules, only a small amount of light is absorbed, finally, the incident light is transmitted to the reflective material freely and then is reflected out, the macro presents full transparent color. Due to the property of the smectic liquid crystal, the liquid crystal molecules maintain a transparent state after the heating is stopped.

Finally, the first liquid crystal microcapsule of the display area with the fourth color presents a transparent state and the second liquid crystal microcapsule presents a transparent state.

The layers of the first liquid crystal microcapsule and the second liquid crystal microcapsule are heated to a transparent state and charged to a misty state. The liquid crystal material presents two states after the low frequency voltage and the heating are applied, and the two states can both maintain after the withdrawal of the voltage or the withdrawal of the heating, therefore the present invention presents a good "multistable property". Among others, the first temperature of the first liquid crystal material refreshing into a transparent state is higher than the second temperature of the first liquid crystal refreshing into a transparent state; the first voltage of the first liquid crystal material refreshing into a misty state is higher than the second temperature voltage of the second liquid crystal refreshing into a misty state.

The present invention provides a driving method by combining high-low voltage and high-low temperature. The method for driving the liquid crystal display device of the present invention makes it possible to realize a multistable high contrast color flexible display and the characteristics that liquid crystal display device can be repeated writing by using the differences between the display characteristics of the driving voltage and the temperature of the two kinds of liquid crystal microcapsules.

FIG. 1 is an schematic illustration of the cross-sectional view of a liquid crystal display device in one example of the present invention. As shown in FIG. 1, the present invention provides a liquid crystal display device comprising an upper substrate 11 whose lower surface is covered with a first transparent electrode 13; a lower substrate 12 whose upper surface is covered with a second transparent electrode 14. One layer of the smectic liquid crystal microcapsule is sealed between the upper substrate 11 and the lower substrate 12 and is distributed between the first transparent electrode 13 and the second transparent electrode 14. The layers of an encapsulated liquid crystal comprise a first liquid crystal microcapsule 15 and a second liquid crystal microcapsule 16 which are uniformly mixed in a certain ratio, and the mixing ratio can be adjusted in accordance with the effect of display uniformity.

The materials of the upper substrate 11 and the lower substrate 12 are flexible-bendable plastic film or ultrathin glass substrate, and the materials of the first transparent electrode 13 and the second transparent electrode 14 are organic conductive material or inorganic conductive material. The first transparent electrode 13 and the second transparent electrode 14 are disposed on the upper substrate 11 and the lower substrate 12 respectively by electroplating, sputtering, coating, spin-coating or the like.

As for the liquid crystal microcapsule shown in FIG. 1, the first liquid crystal microcapsule 15 comprises a first liquid crystal material. The first liquid crystal material is a first coating synthesized by adding a conductive material such as an ammonium salt ion in an amount of 0.001%-10% and a first dye in an amount of 0.01-10% into the smectic liquid crystal, and mixing uniformly, and then by using polymer polymerization method such as polymer dispersion method, emulsion polymerization method, suspension polymerization method, or the like.

As for the liquid crystal microcapsule shown in FIG. 1, the second liquid crystal microcapsule 16 comprises a second liquid crystal material. The second liquid crystal material is a second coating synthesized by adding the nematic liquid crystal in an amount of 1%-20%, a conductive material such as an ammonium salt ion in an amount of 0.001%-10% and the second dye in an amount of 0.01-10% into the smectic liquid crystal, and mixing uniformly, and then by using polymer polymerization method such as polymer dispersion method, emulsion polymerization method, suspension polymerization method, or the like.

In the liquid crystal display device shown in FIG. 1, the dye in liquid crystal material can be a single dichroic dye, and can also be a combination of a plurality of single dichroic dyes, which are azo or anthraquinones or a combination of both. In specific uses, the dyes can be one or more selected from Table 1, but are not limited to the dichroic dye compositions in Table 1. The dye compositions are formulated as required and are mixed and dissolved with liquid crystal molecules in a certain ratio by means of heating, ultrasonic wave, suspension or the like to obtain the liquid crystal compositions. The first coating and the second coating are mixed uniformly and then coated between the second transparent electrode 14 and the first transparent electrode 13 by a coating method, which is a roll-to-roll method, to compose the layers of the encapsulated smectic liquid crystal.

TABLE 1

The structure of the dye molecules and the maximum absorption wavelength

| The No. of the dye | Molecular structure | λmax (nm) | Color |
|---|---|---|---|
| 1 | indole-N=N-C6H4-N=N-C6H4-N(C2H5)2 | 574 | purple |
| 2 | O2N-indole-N=N-C6H4-N=N-C6H4-N(C2H5)2 | 610 | blue-green |
| 3 | C2H5O-indole-N=N-C6H4-N=N-C6H4-N(C2H5)2 | 570 | purple |
| 4 | C4H9O2S-indole-N=N-C6H4-N=N-C6H4-N(C2H5)2 | 595 | blue-green |
| 5 | C4H9-C6H4-N=N-C6H4-N=N-C6H4-N(pyrrolidine) | 507 | purple-red |
| 6 | C4H9-C6H4-N=N-C6H4-N=N-C6H4-N(CH3)2 | 526-533 | purple-red |
| 7 | C4H9O2S-C6H4-N=N-naphthyl-N=N-C6H4-N(C2H5)2 | 573 | purple |
| 8 | C8H17O2S-C6H4-N=N-naphthyl-N=N-C6H4-N(pyrrolidine) | 574 | purple |
| 9 | C4H9-C6H4-N=N-naphthyl-N=N-C6H4-N(pyrrolidine) | 533-542 | purple-red |
| 10 | C4H9-C6H4-N=N-C6H4-N=N-C6H4-OC3H7 | 390-398 | yellow |
| 11 | C2H5-C6H4-N=N-naphthyl-N=N-C6H4-N(CH3)-CO-C6H2(X)(OC2H5)(X) | 402 | yellow |

TABLE 1-continued
The structure of the dye molecules and the maximum absorption wavelength
| The No. of the dye | Molecular structure | λmax (nm) | Color |
|---|---|---|---|
| 12 | 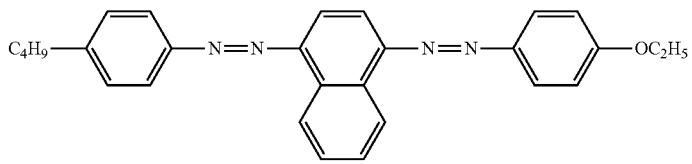 | 439-446 | orange-yellow |
| 13 | 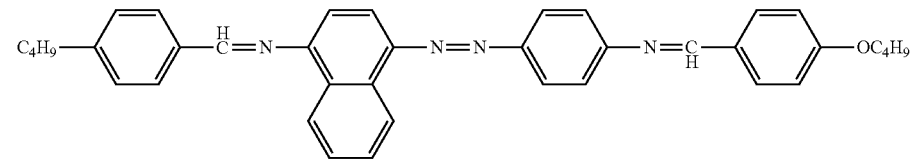 | 443-450 | orange-yellow |
| 14 | 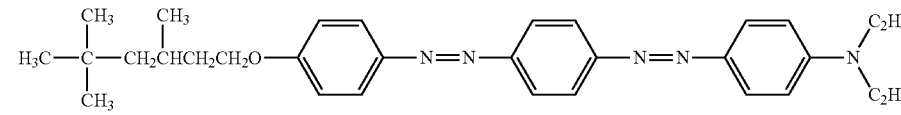 | 511 | red |
| 15 | 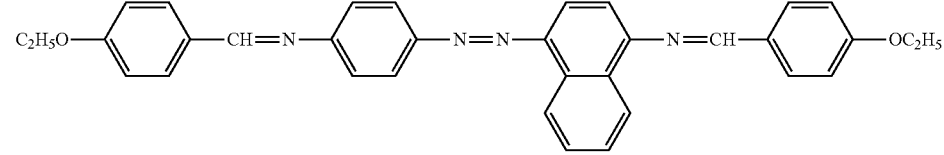 | 447 | orange-yellow |
| 16 | 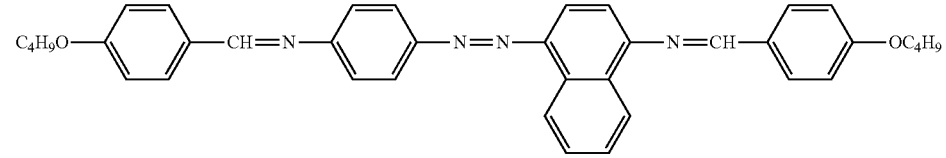 | 450 | orange-yellow |
| 17 | 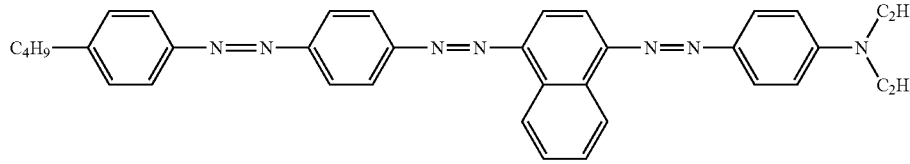 | 563-573 | bluish violet |
| 18 | 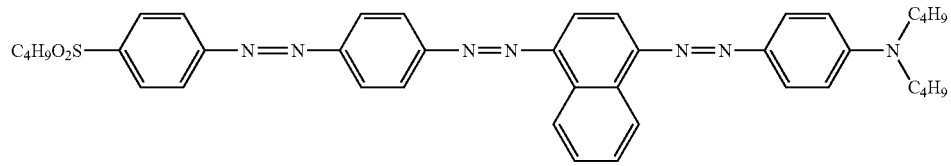 | 580-589 | blue-green |
| 19 | 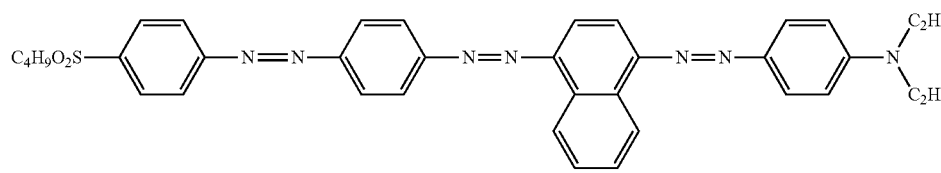 | 591-599 | blue-green |

TABLE 1-continued

The structure of the dye molecules and the maximum absorption wavelength

| The No. of the dye | Molecular structure | λmax (nm) | Color |
|---|---|---|---|
| 20 | $C_4H_9O_2S$–C$_6$H$_4$–N=N–C$_6$H$_4$–N=N–(naphthyl)–N=N–C$_6$H$_4$–N($C_8H_{17}$)$_2$ | 592-600 | blue-green |
| 21 | $C_4H_9$–C$_6$H$_4$–N=N–(thienothiophene)–N=N–(naphthyl)–N($C_2H_5$)$_2$ | 621-660 | blue |
| 22 | $C_4H_9$–(benzothiazolyl)–N=N–C$_6$H$_4$–N=N–C$_6$H$_4$–N=N–C$_6$H$_4$–N($C_2H_5$)$_2$ | 591-600 | blue-green |
| 23 | $C_6H_{13}$–C$_6$H$_4$–C(=O)O–C$_6$H$_4$–N=N–(naphthyl)–N=N–(naphthyl)–N=N–(tetrahydroquinoline with $CH_3$, $C_5H_{11}$, $CH_3$, $CH_3$, $H_3C$ substituents) | 634-643 | blue |
| 24 | $C_6H_{13}OC$(=O)–C$_6$H$_4$–N=N–(thienothiophene)–N=N–(naphthyl)–N(pyrrolidine) | 674 | blue |
| 25 | 1,5-diamino-4,8-dihydroxy-anthraquinone with –C$_6$H$_4$–$OC_6H_{13}$ substituent | 640 | blue |
| 26 | 1,5-diamino-4,8-dihydroxy-anthraquinone with –C$_6$H$_3$(CH$_3$)–$OC_2H_4OC_6H_{13}$ substituent | 645 | blue |
| 27 | diamino-naphthalenedione-imide with N–$C_3H_6OC_8H_{17}$ | 680 | blue |

TABLE 1-continued
The structure of the dye molecules and the maximum absorption wavelength
| The No. of the dye | Molecular structure | λmax (nm) | Color |
|---|---|---|---|
| 28 | 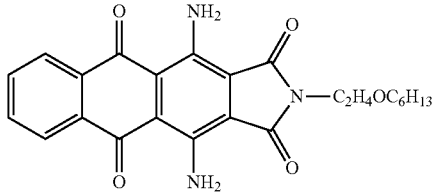 | 760 | blue |
| 29 | 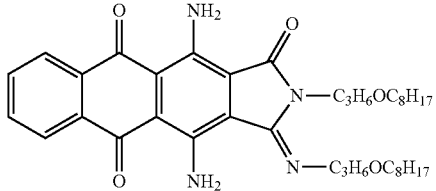 | 670 | blue |
| 30 | 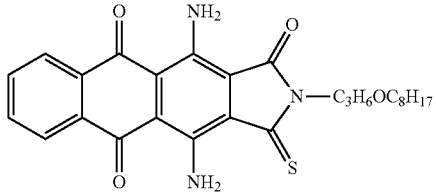 | 760 | blue |
| 31 | 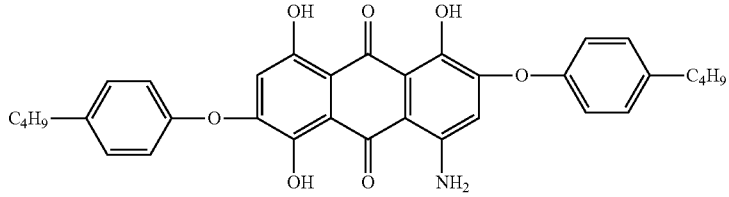 | 595 | blue-green |
| 32 | 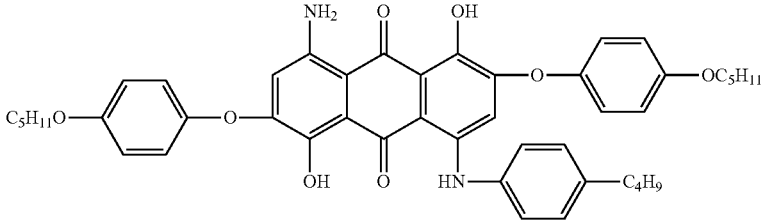 | 630 | blue |
| 33 | 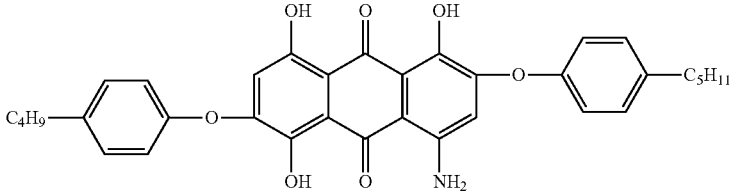 | 595 | blue-green |
| 34 | 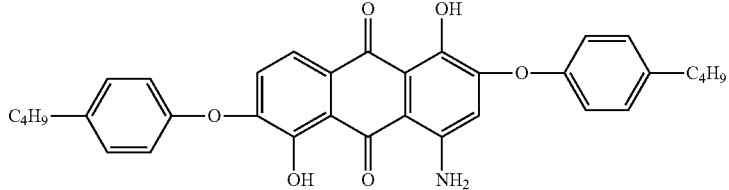 | 535 | purple-red |

TABLE 1-continued

The structure of the dye molecules and the maximum absorption wavelength

| The No. of the dye | Molecular structure | λmax (nm) | Color |
|---|---|---|---|
| 35 | $C_4H_9$—⟨phenyl⟩—O—[anthraquinone with OH, OH, OH, O, O, $NH_2$ substituents]—O—⟨phenyl⟩—$C_7H_{15}$ | 595 | blue-green |

The two liquid crystal materials are mixed uniformly respectively and made into two kinds of liquid crystal microcapsules respectively by polymer dispersion method or polymer polymerization method, such as emulsion polymerization method or suspension polymerization method. The diameter of microspheres is 15-20 μm, and the two kinds of liquid crystal microcapsules are mixed in a ratio of 1:1 and stirred for 2 to 3 hours to be mixed uniformly. The coating is coated between the second transparent electrode 14 and the first transparent electrode 13 by a coating method, which is a roll-to-roll method, to compose a single layer of the liquid crystal arranged with microcapsules, and a white reflective material is added to the non-liquid crystal surface of the second transparent electrode to configure a liquid crystal display device, in which the thickness of the layers of liquid crystal microcapsule is generally maintained at 5-100 μm, and particularly preferred is 5-70 μm.

In some specific manufacturing processes, the layer of the first transparent electrode 13 can be disposed on the layers of the encapsulated smectic liquid crystal, and then covered with the upper substrate 11 to be made into a smectic microcapsule liquid crystal display device.

In a liquid crystal display device according to some examples of the present invention, a flexible reflective backplane is disposed on the lower side of the lower substrate 12, or, the backplane is eliminated by using a lower substrate made of a reflective material instead.

In a liquid crystal display device according to some examples of the present invention, color display can be achieved by applying different voltages and different heating temperatures to the whole surface or partial area of the display device. The magnitudes of the temperature and voltage in the display driving method of the smectic phase microcapsules in the liquid crystal display device are relevant to the liquid crystal material in the capsules. The first and the second liquid crystal materials used in the present invention preferably satisfy the following criteria:

The first voltage of the first liquid crystal material refreshing into a misty state is higher than the second voltage of the second liquid crystal material refreshing into a misty state; the first temperature of the first liquid crystal material refreshing into a transparent state is higher than the second temperature of the second liquid crystal material refreshing into a transparent state; the layers of the first liquid crystal microcapsule present a transparent state at a heating temperature of 50-70° C., and present a misty state when a low frequency voltage of 0-100 V is applied; the second liquid crystal microcapsule presents a transparent state at a heating temperature of 40-60° C., and presents a misty state when a low frequency voltage of 0-90 V is applied; the difference between the first temperature and the second temperature can reach 5-20° C., and the difference between the first voltage and the second voltage can reach 5-30 V, generally, the first temperature is higher than the second temperature by 10-20° C., and the first voltage is higher than the second voltage by 10-30 V.

In a liquid crystal display device according to the above-mentioned examples of the present invention, the driving method, in turn, is applying the first voltage, the first temperature, the second voltage and the second temperature, wherein the whole display surface is driven by the voltage and the whole display surface or the partial display surface is driven by heating. The color flexible display with two to four colors can be achieved by combining different temperatures and voltages.

The driving method of the display area with the first color, in turn, is applying the first voltage, not applying the first temperature, applying the second voltage and applying the second temperature: when the first voltage is applied, the layers of the first liquid crystal microcapsule and the second liquid crystal microcapsule both present a misty state; when the first temperature is not applied, the layers of the first liquid crystal microcapsule and the second liquid crystal microcapsule maintain a misty state; when the second voltage is applied further, the first liquid crystal microcapsule maintains a misty state and the second liquid crystal microcapsule presents a misty state; when the second temperature is applied finally, the first liquid crystal microcapsule presents a misty state and the second liquid crystal microcapsule presents a transparent state.

Figure 2:
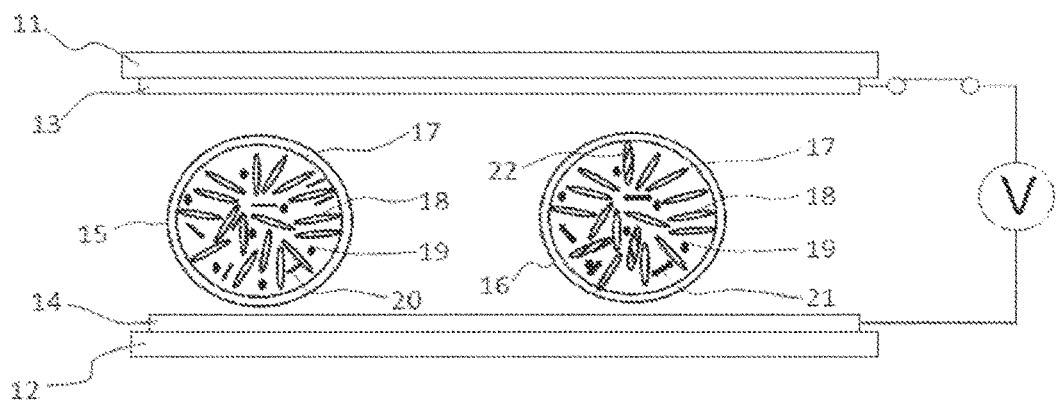
FIG. 2 is a schematic illustration of the present invention that the first voltage is applied so that the first liquid crystal microcapsule and the second liquid crystal microcapsule both present a misty state.

As shown in FIG. 2, the first liquid crystal microcapsule turns into a misty state after applying the first voltage. Since the first voltage is higher than the second voltage, the second liquid crystal microcapsule also refreshes into a misty state simultaneously, therefore the first liquid crystal microcapsule and the second liquid crystal microcapsule both present a misty state.

When the first temperature is not applied, the first liquid crystal microcapsule and the second liquid crystal microcapsule maintain a misty state, and the liquid crystal maintains the above-mentioned state unchanged.

When the second voltage is applied further, the liquid crystal maintains the above-mentioned state unchanged, the second voltage is lower than the first voltage and does not work for the first liquid crystal microcapsule which maintains a misty state; the second voltage causes the second liquid crystal microcapsule to refresh into a misty state; therefore, the first liquid crystal microcapsule maintains a misty state and the second liquid crystal microcapsule presents a misty state.

Figure 3:
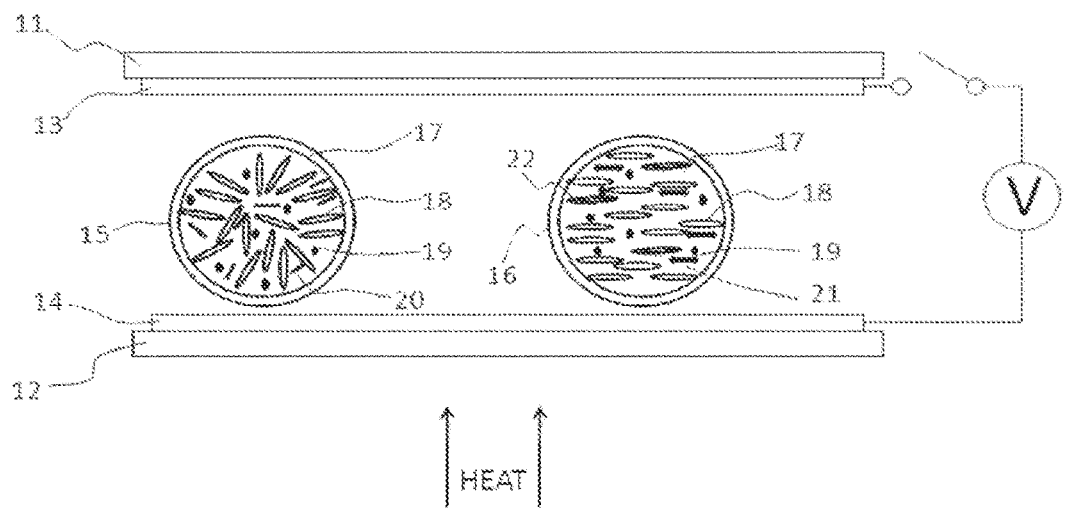
FIG. 3 is a schematic illustration of the present invention that the second temperature is applied so that the first liquid crystal microcapsule presents a misty state and the second liquid crystal microcapsule presents a transparent state.

As shown in FIG. 3, the second temperature is finally applied, the second temperature is lower than the first temperature and does not work for the first liquid crystal microcapsule which maintains a misty state; the second temperature causes the second liquid crystal microcapsule to refresh into a transparent state; therefore, the first liquid crystal microcapsule presents a misty state and the second liquid crystal microcapsule presents a transparent state.

The driving method of the display area with the second color, in turn, is applying the first voltage, applying the first temperature, applying the second voltage and not applying the second temperature: when the first voltage is applied, the first liquid crystal microcapsule and the second liquid crystal microcapsule both present a misty state; when the first temperature is applied further, the first liquid crystal microcapsule and the second liquid crystal microcapsule both turn into a transparent state; when the second voltage is applied further, the first liquid crystal microcapsule maintains the transparent state and the second liquid crystal microcapsule presents a misty state; when the second temperature is not applied, the first liquid crystal microcapsule maintains the transparent state and the second liquid crystal microcapsule maintains the misty state.

Figure 4:
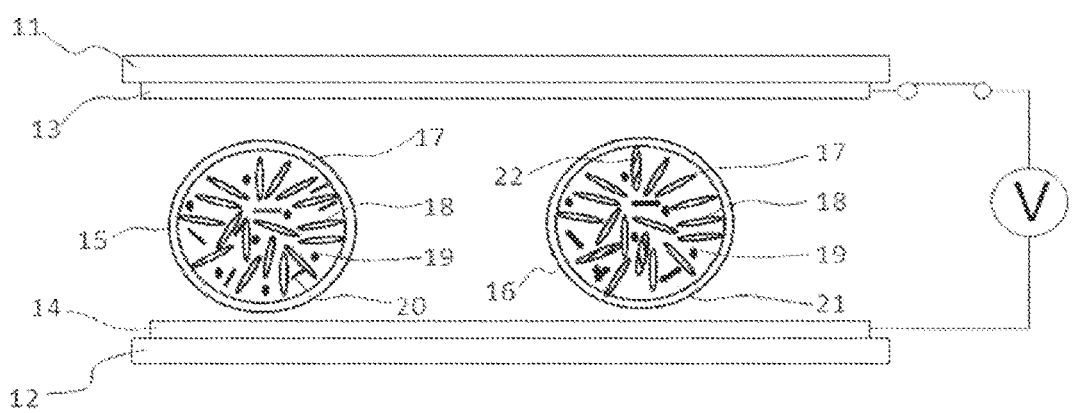
FIG. 4 is a schematic illustration of the present invention that the first voltage is applied so that the first liquid crystal microcapsule and the second liquid crystal microcapsule both present in a misty state.

As shown in FIG. 4, when the first voltage is applied, the first liquid crystal microcapsule turns to be misty. Since the first voltage is higher than the second voltage, the second liquid crystal microcapsule also refreshes into a misty state simultaneously; therefore, the first liquid crystal microcapsule and the second liquid crystal microcapsule both present a misty state.

Figure 5:
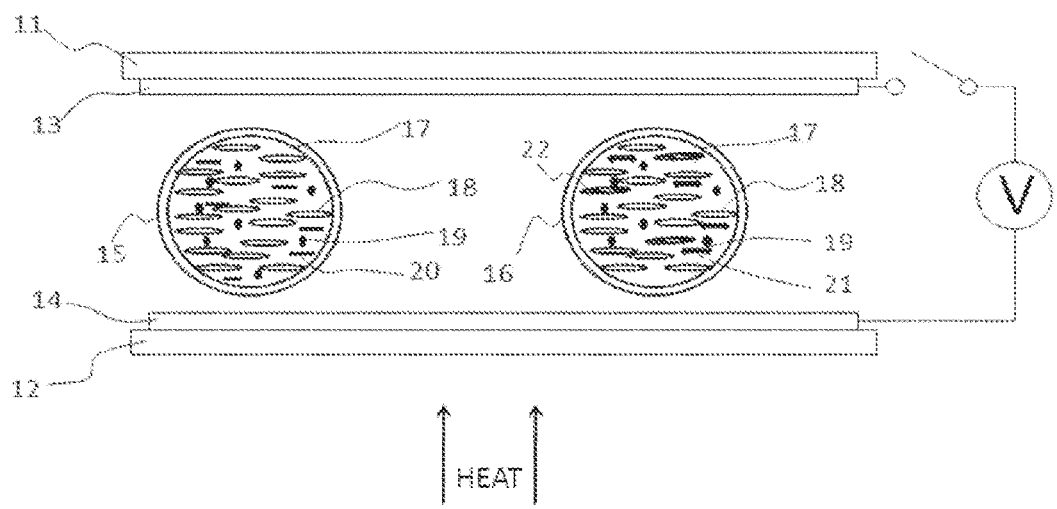
FIG. 5 is a schematic illustration of the present invention that the first temperature is applied so that the first liquid crystal microcapsule and the second liquid crystal microcapsule both turn into a transparent state.

As shown in FIG. 5, when the first temperature is applied further, the first liquid crystal microcapsule refreshes into a transparent state; the first temperature is higher than the second temperature and also works for the second liquid crystal microcapsule which also refreshes into a transparent state; therefore, the first liquid crystal microcapsule and the second liquid crystal microcapsule both turn into a transparent state.

Figure 6:
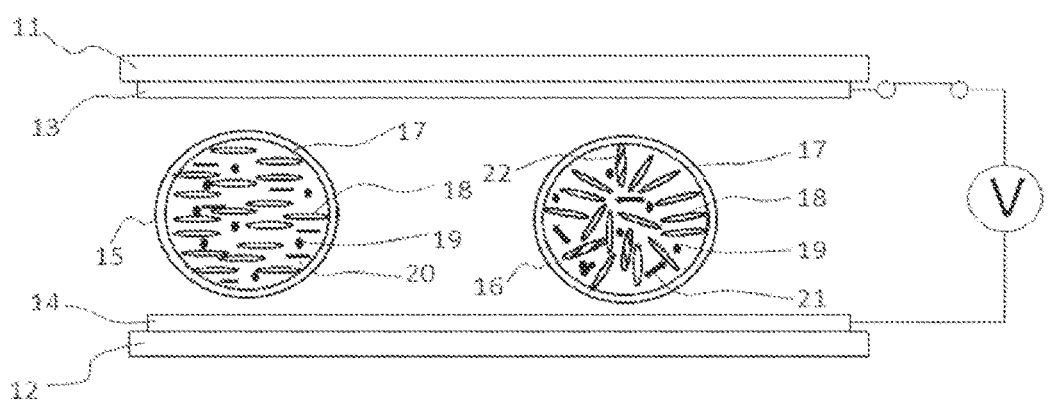
FIG. 6 is a schematic illustration of the present invention that the second voltage is applied so that the first liquid crystal microcapsule maintains a transparent state and the second liquid crystal microcapsule presents a misty state.

As shown in FIG. 6, when the second voltage is applied further, the second voltage is lower than the first voltage and does not work for the first liquid crystal microcapsule which maintains a transparent state; the second voltage causes the second liquid crystal microcapsule to refresh into a misty state; therefore, the first liquid crystal microcapsule maintains a transparent state and the second liquid crystal microcapsule presents a misty state.

When the second temperature is not applied, the first liquid crystal microcapsule maintains a transparent state and the second liquid crystal microcapsule maintains a misty state, and the liquid crystal maintains the above-mentioned state unchanged.

The driving method of the display area with the third color, in turn, is applying the first voltage, not applying the first temperature, applying the second voltage and not applying the second temperature: when the first voltage is applied, the first liquid crystal microcapsule and the second liquid crystal microcapsule both present a misty state; when the first temperature is not applied, the first liquid crystal microcapsule and the second liquid crystal microcapsule both maintain the misty state; when the second voltage is applied further, the first liquid crystal microcapsule and the second liquid crystal microcapsule both maintain the misty state; when the second temperature is not applied, the first liquid crystal microcapsule and the second liquid crystal microcapsule maintain the misty state.

The driving method of the display area with the third color, in turn, is applying the first voltage, not applying the first temperature, applying the second voltage and not applying the second temperature.

Figure 7:
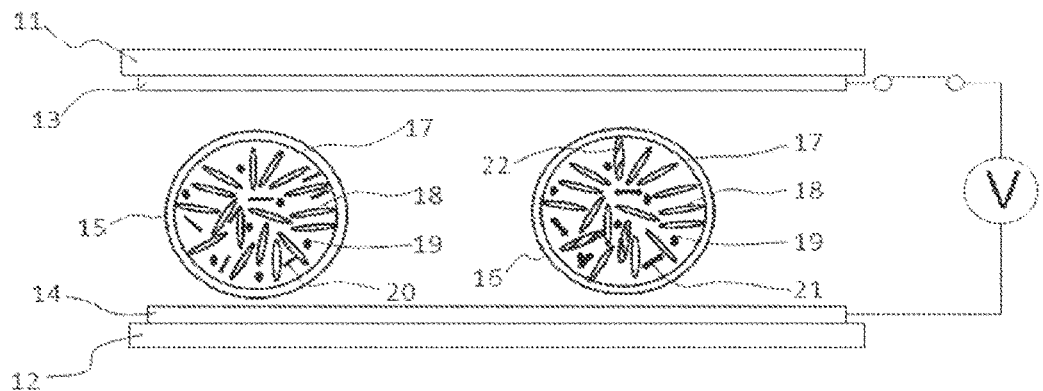
FIG. 7 is a schematic illustration of the present invention that the first voltage is applied so that the first liquid crystal microcapsule and the second liquid crystal microcapsule both present a misty state.

As shown in FIG. 7, when the first voltage is applied, the first liquid crystal microcapsule turns to be misty. Since the first voltage is higher than the second voltage, the second liquid crystal microcapsule also refreshes into a misty state simultaneously, and the first liquid crystal microcapsule and the second liquid crystal microcapsule both present a misty state.

When the first temperature is not applied, the first liquid crystal microcapsule and the second liquid crystal microcapsule both maintain a misty state, and the liquid crystal maintains the above-mentioned state unchanged.

When the second voltage is applied further, the liquid crystal maintains the above-mentioned state unchanged; the second voltage is lower than the first voltage and does not work for the first liquid crystal microcapsule which maintains a misty state; the second voltage causes the second liquid crystal microcapsule to refresh into a misty state; therefore, the first liquid crystal microcapsule and the second liquid crystal microcapsule maintains a misty state.

When the second temperature is not applied, the first liquid crystal microcapsule and the second liquid crystal microcapsule both maintain a misty state, and the liquid crystal maintains the above-mentioned state unchanged.

The driving method of the display area with the fourth color, in turn, is applying the first voltage, applying the first temperature, applying the second voltage and applying the second temperature: when the first voltage is applied, the first liquid crystal microcapsule and the second liquid crystal microcapsule both present a misty state; when the first temperature is applied further, the first liquid crystal microcapsule and the second liquid crystal microcapsule both turn into a transparent state; when the second voltage is applied further, the first liquid crystal microcapsule maintains the transparent state and the second liquid crystal microcapsule presents a misty state; when the second temperature is applied, the first liquid crystal microcapsule maintains the transparent state and the second liquid crystal microcapsule presents a transparent state.

Figure 8:
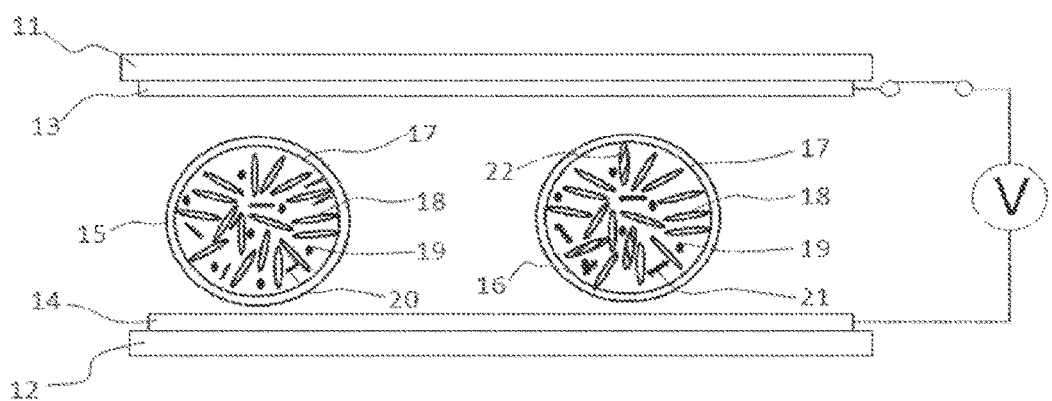
FIG. 8 is a schematic illustration of the present invention that the first voltage is applied so that the first liquid crystal microcapsule and the second liquid crystal microcapsule both present a misty state.

As shown in FIG. 8, when the first voltage is applied, the first liquid crystal microcapsule turns to be misty. Since the first voltage is higher than the second voltage, the second liquid crystal microcapsule also refreshes into a misty state simultaneously, and the first liquid crystal microcapsule and the second liquid crystal microcapsule both present a misty state.

Figure 9:
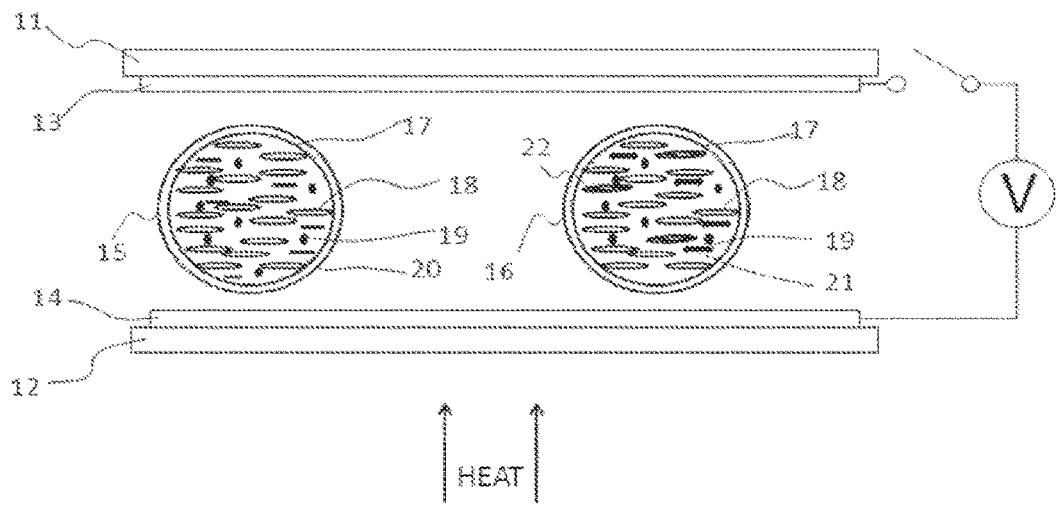
FIG. 9 is a schematic illustration of the present invention that the first temperature is applied so that the first liquid crystal microcapsule and the second liquid crystal microcapsule both turn into a transparent state.

As shown in FIG. 9, when the first temperature is applied further, the first liquid crystal microcapsule refreshes into a transparent state; the first temperature is higher than the second temperature and also works for the second liquid crystal microcapsule which also refreshes into a transparent state; therefore, the first liquid crystal microcapsule and the second liquid crystal microcapsule both turn into a transparent state.

Figure 10:
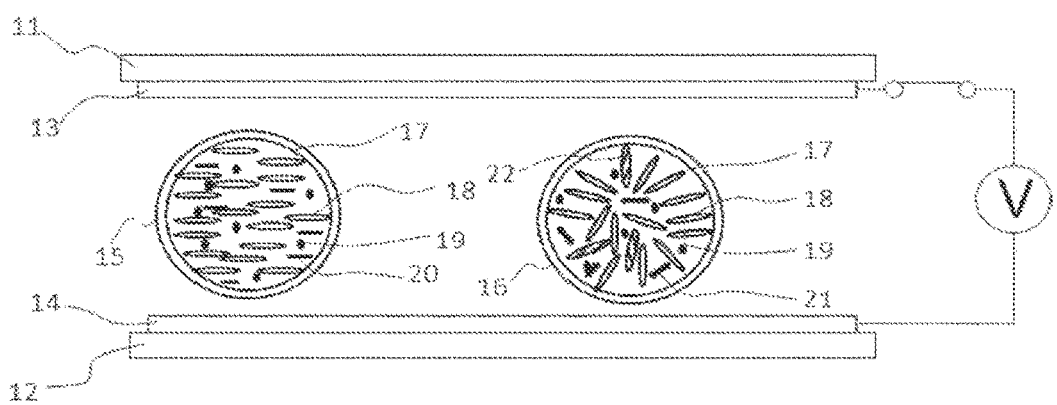
FIG. 10 is a schematic illustration of the present invention that the second voltage is applied so that the first liquid crystal microcapsule maintains a transparent state and the second liquid crystal microcapsule presents a misty state.

As shown in FIG. 10, when the second voltage is applied further, the second voltage is lower than the first voltage and does not work for the first liquid crystal microcapsule which maintains a transparent state; the second voltage causes the second liquid crystal microcapsule to refresh into a misty state; therefore, the first liquid crystal microcapsule maintains the transparent state and the second liquid crystal microcapsule presents a misty state.

Figure 11:
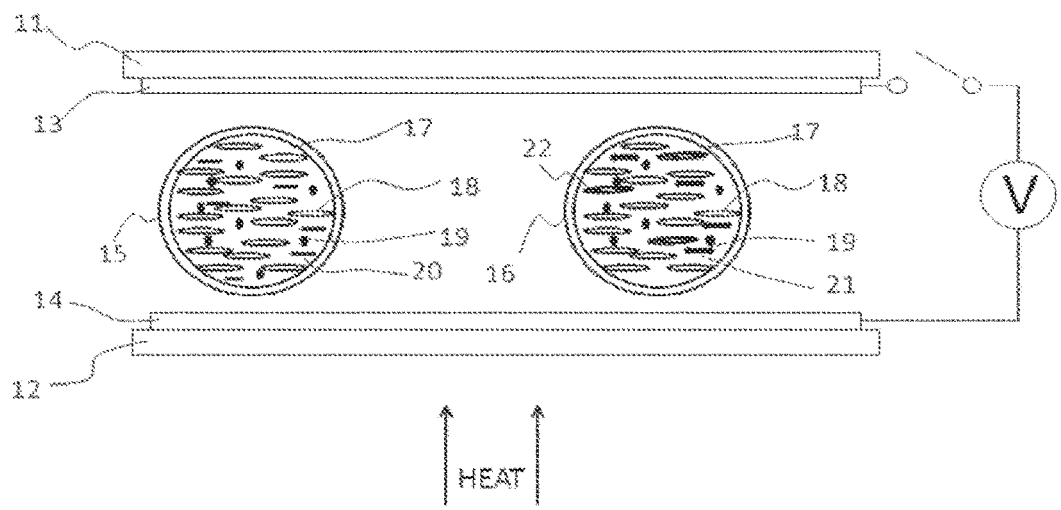
FIG. 11 is a schematic illustration of the present invention that the second temperature is applied so that the first liquid crystal microcapsule maintains a transparent state and the second liquid crystal microcapsule presents a transparent state.

As shown in FIG. 11, when the second temperature is applied, the second temperature is lower than the first temperature and does not work for the first liquid crystal microcapsule which maintains the transparent state; the second temperature causes the second liquid crystal microcapsule to refresh into a transparent state; therefore, the first liquid crystal microcapsule maintains the transparent state and the second liquid crystal microcapsule presents a transparent state.

In a liquid crystal display device according to the above-mentioned examples of the present invention, the accuracy of the color display is determined by the accuracy of the heated tips of the thermal printer.

In some examples, when the white reflector is selected for the backplane, the first liquid crystal microcapsule of the display area with the first color presents a misty state and the second liquid crystal microcapsule presents a transparent state, and the first liquid crystal microcapsule of the display area with the second color presents a transparent state and the second liquid crystal microcapsule presents a misty state, i.e. the display area with the second color presents the color of the second dye reflected by the second liquid crystal microcapsule; the first liquid crystal microcapsule of the display area with the third color presents a misty state and the second liquid crystal microcapsule presents a misty state, i.e. the display area with the third color presents the color of the first dye reflected by the first liquid crystal microcapsule and the color of the second dye reflected by the second liquid crystal microcapsule, i.e., a color combined with these two colors. The first liquid crystal microcapsule of the display area with the fourth color presents a transparent state and the second liquid crystal microcapsule presents a transparent state, i.e. the white color of the backplane displays.

In some examples, the backplane uses a white reflector and the first dye and the second dye are mixed in a certain ratio to show black, so that while the color display is displayed, the B/W display can also be achieved.

Figure 16:
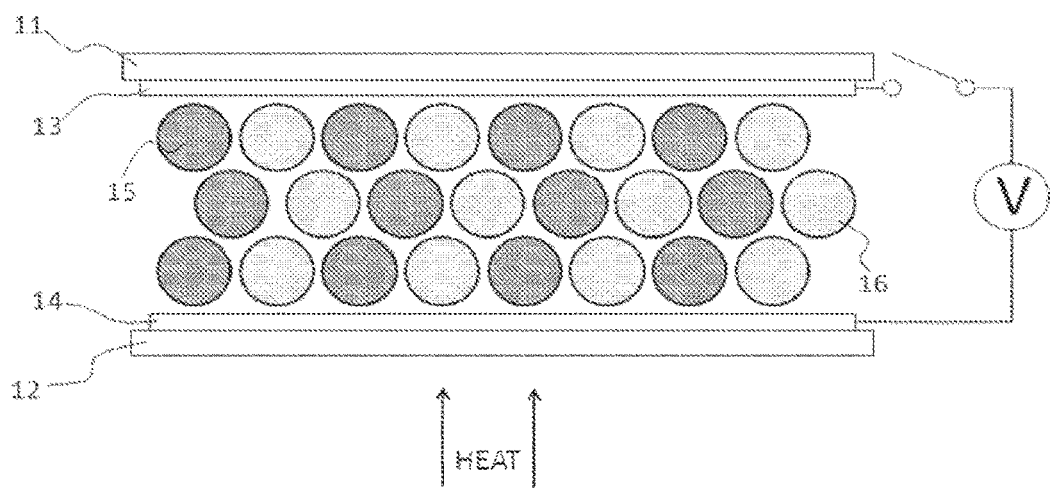
FIG. 16 is a schematic illustration of a cross-sectional view of a liquid crystal display device in a further example of the present invention.

As a further example of the present invention, as shown in FIG. 16, the present invention provides a liquid crystal display device whose structure is basically the same as the above-mentioned examples, and the difference only lies in that the layers of the encapsulated liquid crystal are multilayer, the layers of the encapsulated liquid crystal are coated between the second transparent electrode 14 and the first transparent electrode 13 by the same coating method as in the above-mentioned examples, and the coating method is a roll-to-roll method, and the layers of the liquid crystal arranged with microcapsules are composed after several coating. The method and principle for driving the liquid crystal display device of this example are same as those of the above-mentioned examples, and will not be described here again.

EXAMPLE 1

With reference to FIG. 1, the present invention provides a liquid crystal display device comprising an upper substrate 11 whose lower surface is covered with a first transparent electrode 13; a lower substrate 12 whose upper surface is covered with a second transparent electrode 14. The materials of the upper substrate 11 and the lower substrate 12 are selected from flexible-bendable plastic films or ultrathin glass substrates, and the materials of the first transparent electrode 13 and the second transparent electrode 14 are selected from organic conductive materials or inorganic conductive materials. The first transparent electrode 13 and the second transparent electrode 14 are disposed on the upper substrate 11 and the lower substrate 12 respectively by electroplating, sputtering, coating, spin-coating or the like. The layers of the smectic liquid crystal microcapsule are sealed between the upper substrate 11 and the lower substrate 12, i.e. are distributed between the first transparent electrode 13 and the second transparent electrode 14. The layers of the encapsulated liquid crystal comprise a first liquid crystal microcapsule 15 and a second liquid crystal microcapsule 16 which are uniformly mixed in a certain ratio. It can be divided into the single layer of the smectic microcapsule structure as shown in FIG. 1 and the multilayer of the smectic microcapsule structure as shown in FIG. 16 according to the different number of the layers of the encapsulated liquid crystal.

As for the liquid crystal microcapsule shown in FIG. 1, the first liquid crystal microcapsule 15 comprises a first liquid crystal material. The first liquid crystal material is a first coating synthesized by adding the conductive material and the first dye into the smectic liquid crystal, and mixing uniformly, and then by using polymer polymerization method such as polymer dispersion method, emulsion polymerization method, suspension polymerization method or the like.

As for the liquid crystal microcapsule shown in FIG. 1, the second liquid crystal microcapsule 16 comprises a second liquid crystal material. The second liquid crystal material is a second coating synthesized by adding the nematic liquid crystal and then, the conductive material and the second dye into the smectic liquid crystal, and mixing uniformly, and then by using polymer polymerization method such as polymer dispersion method, emulsion polymerization method, suspension polymerization method or the like.

In the liquid crystal display device shown in FIG. 1, the dye in liquid crystal material can be a single dichroic dye, and can also be a combination of a plurality of single dichroic dyes, which are azo or anthraquinones or a combination of both. In specific uses, the dyes can be one or more selected from Table 1. The dye compositions are formulated as required and are mixed and dissolved with liquid crystal molecules in a certain ratio by means of heating, ultrasonic wave, suspension or the like to obtain the liquid crystal compositions. The first coating and the second coating are mixed uniformly and then coated between the second transparent electrode 14 and the first transparent electrode 13 by a coating method, which is a roll-to-roll method, to compose the layers of the encapsulated smectic liquid crystal.

Two kinds of liquid crystal materials are used. The first liquid crystal material is a self-made smectic liquid crystal material prepared by HECHENG, and the formula thereof is shown in Table 2:

TABLE 2

| The formula of the first liquid crystal material | |
|---|---|
| Component | Ratio |
| smectic liquid crystal | 100 |
| tetraoctadecylammonium bromide | 0.1 |
| orange dichroic dyes | 0.15 |

The formula of the smectic liquid crystal material is shown in Table 3:

TABLE 3

The formula of the smectic liquid crystal

| Chemical structural formula | Content % |
|---|---|
| $C_8H_{17}$—⬡—⬡—CN | 51 |
| $C_{10}H_{21}$—⬡—⬡—CN | 26 |
| $C_8H_{17}O$—⬡—⬡—CN | 11 |
| $C_{10}H_{21}O$—⬡—⬡—CN | 12 |

The formula of the second liquid crystal material is shown in Table 4:

TABLE 4

The second liquid crystal material

| Component | Ratio |
|---|---|
| smectic liquid crystal | 100 |
| nematic liquid crystal | 12 |
| tetraoctadecylammonium bromide | 0.1 |
| blue dichroic dyes | 0.33 |

The formula of smectic liquid crystal is same as that of the smectic liquid crystal in the first liquid crystal material.

The formula of nematic liquid crystal is shown in Table 5:

TABLE 5

The formula of nematic liquid crystal

| Chemical structural formula | Content % |
|---|---|
| $C_2H_5$—⬡—C(=O)—O—⬡—⬡—CN | 10 |
| $C_3H_7$—⬡—C(=O)—O—⬡—⬡—CN | 5 |
| $C_{10}H_{21}$—⬡—C(=O)—O—⬡—⬡—$C_3H_7$ | 3 |
| $C_{10}H_{21}$—⬡—C(=O)—O—⬡—⬡—$C_5H_{11}$ | 3 |

TABLE 5-continued

The formula of nematic liquid crystal

| Chemical structural formula | Content % |
|---|---|
| $C_5H_{11}$—⬡—≡—⬡—O—CH$_3$ | 5 |
| $C_4H_9$—⬡—≡—⬡—O—$C_2H_5$ | 4 |
| $C_3H_7$—⬡—⬡—CN | 10 |
| $C_5H_{11}$—⬡—⬡—⬡—CN | 10 |
| $C_2H_5$—⬡—⬡—CN | 10 |
| $C_3H_7$—⬡—⬡—CN | 10 |
| $C_4H_9$—⬡—⬡—CN | 10 |
| $C_5H_{11}$—⬡—⬡—CN | 10 |
| $C_7H_{15}$—⬡—⬡—CN | 10 |

The two liquid crystal materials are mixed uniformly respectively and made into two kinds of liquid crystal microcapsules by polymer dispersion method or polymer polymerization method (such as emulsion polymerization method or suspension polymerization method) respectively. The diameter of microspheres is 15-20 μm, and the two kinds of liquid crystal microcapsules are mixed in a ratio of 1:1 and stirred for 2 to 3 hours to be mixed uniformly.

The coating is coated between the second electrode 14 and the first electrode 13 by a coating method, which is a roll-to-roll method, to compose a single layer of the liquid crystal arranged with microcapsules, and a white reflective material is added on the non-liquid crystal surface of the second electrode to configure a flexible color display device.

In the layers of liquid crystal, the first liquid crystal microcapsule presents a transparent state at a heating temperature of 65° C., and turns into a misty state when a low frequency voltage of 130 V is applied; the second liquid crystal microcapsule presents a transparent state at a heating temperature of 47° C., and turns into a misty state when a low frequency voltage of 115 V is applied. A color display device with blue, orange, black and white can be realized by applying power to the whole surface of the first electrode and the second electrode and locally heating the flexible color display device by a thermal printer, in combination with different driving methods.

Orange and blue, which are two complementary colors, are preferred in this example.

Figure 12:
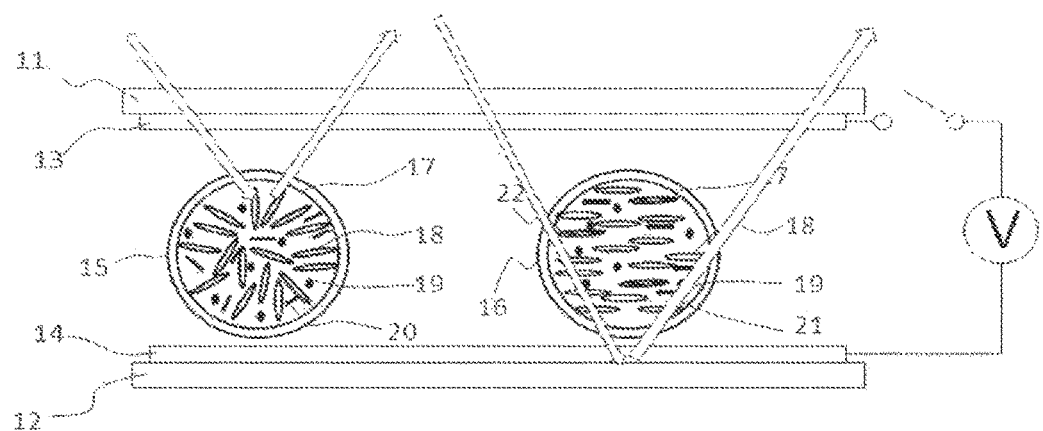
FIG. 12 is a schematic illustration of the present invention that the first liquid crystal microcapsule displays orange and the second liquid crystal microcapsule reflects white light.

The driving method of the display area with the first color, in turn, is applying the voltage of 130 V, not applying the heating temperature of 65° C., applying the voltage of 115 V and applying the heating temperature of 47° C. As shown in FIG. 12, when the driving is finished, the first liquid crystal microcapsule presents a misty state and the second liquid crystal microcapsule presents a transparent state, and the orange light reflected by the first liquid crystal microcapsule is displayed, in which, when the incident light is incident on the first liquid crystal microcapsule, orange light is displayed and the other colors of light are absorbed. When the incident light is incident on the second liquid crystal microcapsule, the incident light is transmitted to the white reflective material, reflecting the white light, and all the emergent light looks like orange.

Figure 13:
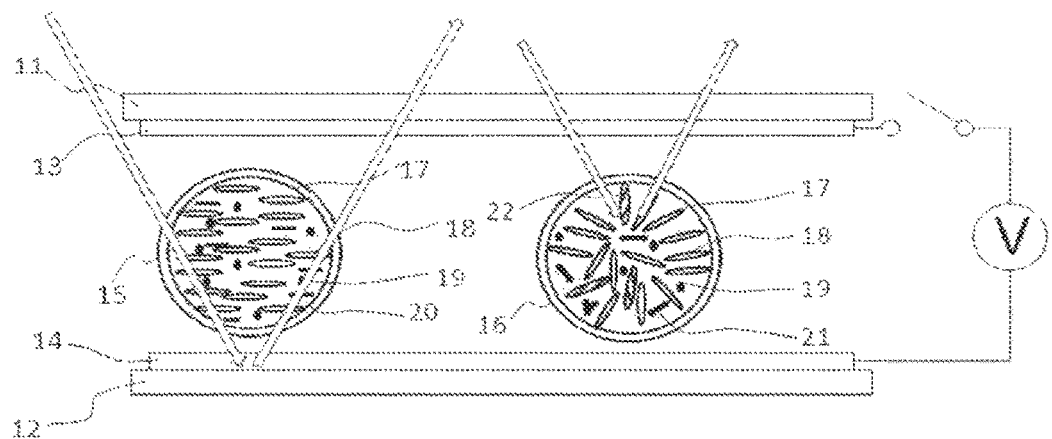
FIG. 13 is a schematic illustration of the black synthesised by orange displayd by the first liquid crystal microcapsule and blue displayed by the second liquid crystal microcapsule of the present invention.

The driving method of the display area with the second color, in turn, is applying a voltage of 130 V, applying a temperature of 65° C., applying a voltage of 115 V and not applying a heating temperature of 47° C. As shown in FIG. 13, when the driving is finished, the first liquid crystal microcapsule presents a transparent state and the second liquid crystal microcapsule presents a misty state, and the blue light reflected by the second liquid crystal microcapsule is displayed, in which, as shown in FIG. 8, when the incident light is incident on the first liquid crystal microcapsule, the incident light is transmitted to the white reflective material, reflecting the white light; when the incident light is incident on the second liquid crystal microcapsule, blue light is displayed and the other colors of light are absorbed, and all the emergent light looks like blue.

Figure 14:
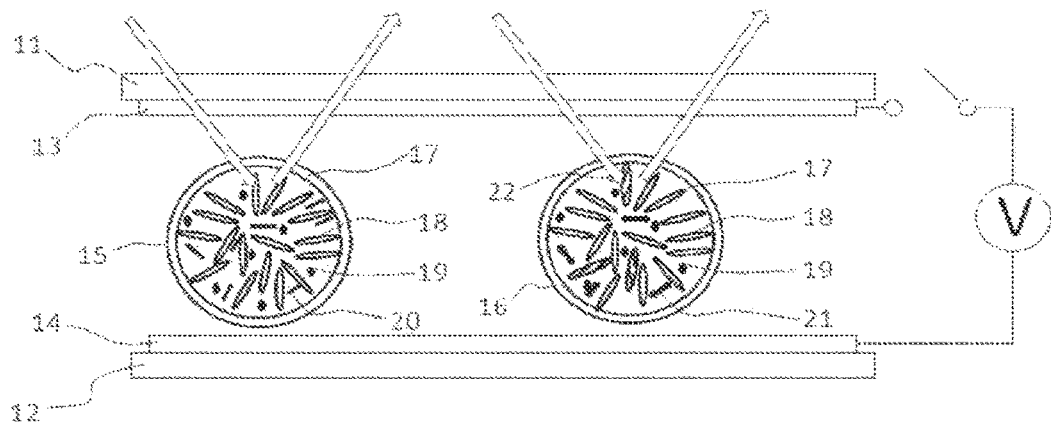
FIG. 14 is a schematic illustration of the present invention that the first liquid crystal microcapsule reflects white light and the second liquid crystal microcapsule displays blue.

The driving method of the display area with the third color, in turn, is applying a voltage of 130 V, not applying a temperature of 65° C., applying a voltage of 115 V and not applying a heating temperature of 47° C. As shown in FIG. 14, when the driving is finished, the two kinds of microcapsules both are in a misty state, the orange and blue lights reflected by the two kinds of microcapsules are superposed to show black, in which, as shown in FIG. 10, when the incident light is incident on the first liquid crystal microcapsule, orange light is displayed and the other colors of light are absorbed; when the incident light is incident on the second liquid crystal microcapsule, blue light is displayed and the other colors of light are absorbed; and all the emergent light, which presents black, is the superposition of the orange light and the blue light.

Figure 15:
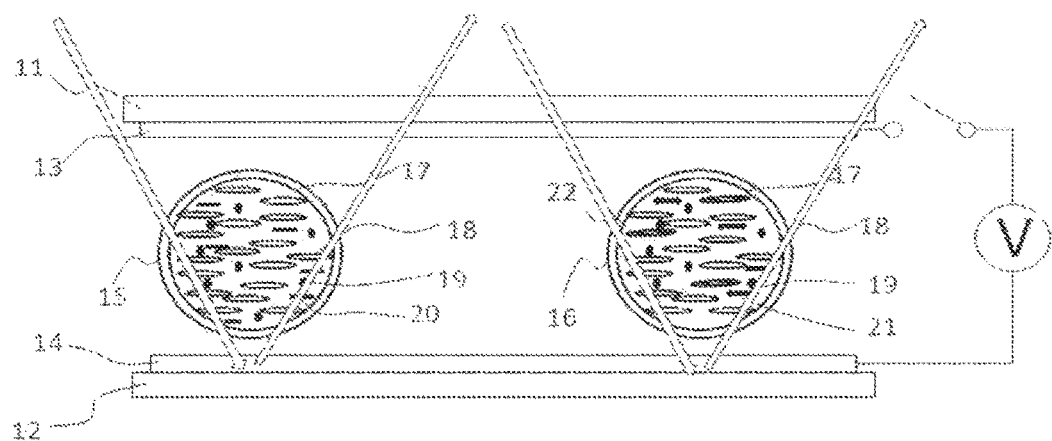
FIG. 15 is a schematic illustration of the present invention that the first liquid crystal microcapsule and the second liquid crystal microcapsule both reflect white light.

The driving method of the display area with the fourth color, in turn, is applying a voltage of 130 V, applying a temperature of 65° C., applying a voltage of 115 V and applying a heating temperature of 47° C. As shown in FIG. 15, when the driving is finished, the two kinds of liquid crystal microcapsules both are in a transparent state, the dichroic dye molecules still have a certain light absorption property, and the white color close to the color of the reflective material is displayed, in which, as shown in FIG. 15, when the incident light is incident on the first liquid crystal microcapsule and the second liquid crystal microcapsule, the incident light is transmitted to the white reflective material and the white color is finally reflected. In the liquid crystal display device according to the above-mentioned examples of the present invention, the accuracy of the color display is determined by the accuracy of the heated tips of the thermal printer.

The accuracy of the color display is determined by the accuracy of the heated tips of the thermal printer.

EXAMPLE 2

With reference to FIG. 1, the present invention provides a liquid crystal display device comprising an upper substrate 11 whose lower surface is covered with a first transparent electrode 13; a lower substrate 12 whose upper surface is covered with a second transparent electrode 14. The materials of the upper substrate 11 and the lower substrate 12 are selected from flexible-bendable plastic films or ultrathin glass substrates, and the materials of the first transparent electrode 13 and the second transparent electrode 14 are selected from organic conductive materials or inorganic conductive materials. The first transparent electrode 13 and the second transparent electrode 14 are disposed on the upper substrate 11 and the lower substrate 12 respectively by electroplating, sputtering, coating, spin-coating or the like. The layers of the smectic liquid crystal microcapsule are sealed between the upper substrate 11 and the lower substrate 12, i.e. is distributed between the first transparent electrode 13 and the second transparent electrode 14. The layers of the encapsulated liquid crystal comprise a first liquid crystal microcapsule 15 and a second liquid crystal microcapsule 16 which are uniformly mixed in a certain ratio. It can be divided into the single layer of the smectic microcapsule structure as shown in FIG. 1 and the multilayer of the smectic microcapsule structure as shown in FIG. 16 according to the different number of the layers of the encapsulated liquid crystal.

As for the liquid crystal microcapsule shown in FIG. 1, the first liquid crystal microcapsule 15 comprises a first liquid crystal material. The first liquid crystal material is a first coating synthesized by adding the conductive material and the first dye into the smectic liquid crystal, and mixing uniformly, and then by using polymer polymerization method such as polymer dispersion method, emulsion polymerization method, suspension polymerization method or the like.

As for the liquid crystal microcapsule shown in FIG. 1, the second liquid crystal microcapsule 16 comprises a second liquid crystal material. The second liquid crystal material is a second coating synthesized by adding the nematic liquid crystal and then, the conductive material and the second dye into the smectic liquid crystal, and mixing uniformly, and then by using polymer polymerization method such as polymer dispersion method, emulsion polymerization method, suspension polymerization method or the like.

In the liquid crystal display device shown in FIG. 1, the dye in liquid crystal material can be a single dichroic dye, and can also be a combination of a plurality of single dichroic dyes, which are azo or anthraquinones or a combination of both. In specific uses, the dyes can be one or more selected from Table 1. The dye compositions are formulated as required and are mixed and dissolved with liquid crystal molecules in a certain ratio by means of heating, ultrasonic wave, suspension or the like to obtain the liquid crystal compositions. The first coating and the second coating are mixed uniformly and then coated between the second transparent electrode 14 and the first transparent electrode 13 by a coating method, which is a roll-to-roll method, to compose the layers of the encapsulated smectic liquid crystal.

In the liquid crystal display device of Example 2 of the present invention, the liquid crystal microcapsules use two kinds of liquid crystal materials. The formula of the first liquid crystal material is shown in Table 6:

TABLE 6

The formula of the first liquid crystal material

| Component | Ratio |
| --- | --- |
| smectic liquid crystal | 100 |
| tetraoctadecylammonium bromide | 0.1 |
| red dichroic dyes | 0.15 |

The formula of the second liquid crystal material is shown in Table 7:

TABLE 7

The formula of the second liquid crystal material

| Component | Ratio |
| --- | --- |
| smectic liquid crystal | 100 |
| nematic liquid crystal | 10 |
| tetraoctadecylammonium bromide | 0.5 |
| blue dichroic dyes | 0.25 |

The two liquid crystal materials are mixed uniformly respectively and made into two kinds of liquid crystal microcapsules by polymer dispersion method or polymer polymerization method (such as emulsion polymerization method or suspension polymerization method) respectively. The diameter of microspheres is 15-20 μm, and the two kinds of liquid crystal microcapsules are mixed in a ratio of 1:1 and stirred for 2 to 3 hours to be mixed uniformly.

The coating is coated between the second electrode 14 and the first electrode 13 by a coating method, which is a roll-to-roll method, to compose a multilayer of the liquid crystal arranged with microcapsules, and the thickness of the layers of liquid crystal is 40-60 nm, and a white reflective material is added on the non-liquid crystal surface of the second electrode to configure a flexible color display device.

In the layers of liquid crystal, the first liquid crystal microcapsule presents a transparent state at a heating temperature of 65° C., and turns into a misty state when a low frequency voltage of 130 V is applied; the second liquid crystal microcapsule presents a transparent state at a heating temperature of 50° C., and turns into a misty state when a low frequency voltage of 120 V is applied. A color display device with blue, red, atropurpureus and white can be realized by applying power to the whole surface of the first electrode and the second electrode and locally heating the flexible color display device by a thermal printer, in combination with different driving methods.

The driving method of the display area with the first color, in turn, is applying a voltage of 130 V, not applying a heating temperature of 65° C., applying a voltage of 120 V and applying a heating temperature of 50° C. When the driving is finished, the first liquid crystal microcapsule presents a misty state and the second liquid crystal microcapsule presents a transparent state, and the red light reflected by the first liquid crystal microcapsule is displayed.

The driving method of the display area with the second color, in turn, is applying a voltage of 130 V, applying a temperature of 65° C., applying a voltage of 120 V and not applying a heating temperature of 50° C. When the driving is finished, the first liquid crystal microcapsule presents a transparent state and the second liquid crystal microcapsule presents a misty state, and the blue light reflected by the second liquid crystal microcapsule is displayed.

The driving method of the display area with the third color, in turn, is applying a voltage of 130 V, not applying a temperature of 65° C., applying a voltage of 120 V and not applying a heating temperature of 50° C. When the driving is finished, the two kinds of microcapsules both present a misty state, and the red and blue lights reflected by the two microcapsules are superposed to show atropurpureus.

The driving method of the display area with the fourth color, in turn, is applying a voltage of 130 V, applying a temperature of 65° C., applying a voltage of 120 V and applying a heating temperature of 50° C. When the driving is finished, the two kinds of liquid crystal microcapsules both present a transparent state, the dichroic dye molecules still have a certain light absorption property, and the white color close to the color of the reflective material is displayed.

The accuracy of the color display is determined by the accuracy of the heated tips of the thermal printer.

EXAMPLE 3

The structure of the liquid crystal display device of Example 3 of the present invention is shown in FIG. 1, a liquid crystal display device comprises an upper substrate 11 whose lower surface is covered with a first transparent electrode 13; a lower substrate 12 whose upper surface is covered with a second transparent electrode 14. The materials of the upper substrate 11 and the lower substrate 12 are selected from flexible-bendable plastic films or ultrathin glass substrates, and the materials of the first transparent electrode 13 and the second transparent electrode 14 are selected from organic conductive materials or inorganic conductive materials. The first transparent electrode 13 and the second transparent electrode 14 are disposed on the upper substrate 11 and the lower substrate 12 respectively by electroplating, sputtering, coating, spin-coating or the like. The layers of the smectic liquid crystal microcapsule are sealed between the upper substrate 11 and the lower substrate 12, i.e. are distributed between the first transparent electrode 13 and the second transparent electrode 14. The layers of the encapsulated liquid crystal comprise a first liquid crystal microcapsule 15 and a second liquid crystal microcapsule 16 which are uniformly mixed in a certain ratio. It can be divided into the single layer of the smectic microcapsule structure as shown in FIG. 1 and the multilayer of the smectic microcapsule structure as shown in FIG. 16 according to the different number of the layers of the encapsulated liquid crystal.

As for the liquid crystal microcapsule shown in FIG. 1, the first liquid crystal microcapsule 15 comprises a first liquid crystal material. The first liquid crystal material is a first coating which is synthesized by adding the conductive material and the first dye into the smectic liquid crystal, and mixing uniformly, and then by using polymer polymerization method such as polymer dispersion method, emulsion polymerization method, suspension polymerization method or the like.

As for the liquid crystal microcapsule shown in FIG. 1, the second liquid crystal microcapsule 16 comprises a second liquid crystal material. The second liquid crystal material is a second coating synthesized by adding the nematic liquid crystal and then, the conductive material and the second dye into the smectic liquid crystal, and mixing uniformly, and then by using polymer polymerization method such as polymer dispersion method, emulsion polymerization method, suspension polymerization method or the like.

In the liquid crystal display device shown in FIG. 1, the dye in liquid crystal material can be a single dichroic dye, and can also be a combination of a plurality of single dichroic dyes, which are azo or anthraquinones or a combination of both. In specific uses, the dyes can be one or more selected from Table 1. The dye compositions are formulated as required and are mixed and dissolved with liquid crystal molecules in a certain ratio by means of heating, ultrasonic wave, suspension or the like to obtain the liquid crystal compositions. The first coating and the second coating are mixed uniformly and then coated between the second transparent electrode 14 and the first transparent electrode 13 by a coating method, which is a roll-to-roll method, to compose the layers of the encapsulated smectic liquid crystal.

In the liquid crystal display device of Example 1 of the present invention, the liquid crystal microcapsules use two kinds of liquid crystal materials. The formula of the first liquid crystal material is shown in Table 8:

TABLE 8

| The formula of the first liquid crystal material | |
| --- | --- |
| Component | Ratio |
| smectic liquid crystal | 100 |
| hexadecyl triethyl ammonium bromide | 0.2 |
| red dichroic dyes | 0.15 |

The formula of the second liquid crystal material is shown in Table 9:

TABLE 9

| The formula of the second liquid crystal material | |
| --- | --- |
| Component | Ratio |
| smectic liquid crystal | 100 |
| nematic liquid crystal | 10 |
| hexadecyl triethyl ammonium bromide | 0.5 |
| blue dichroic dyes | 0.25 |

The two liquid crystal materials are mixed uniformly respectively and made into two kinds of liquid crystal microcapsules by polymer dispersion method or polymer polymerization method (such as emulsion polymerization method or suspension polymerization method) respectively. The diameter of microspheres is 5-15 μm. The two kinds of liquid crystal microcapsules are mixed in the proportion of the first liquid crystal microcapsule:the second liquid crystal microcapsule:gel=1:1:0.6, and the mixture is stirred for 3 to 4 hours to be mixed uniformly.

The coating is coated between the second electrode 14 and the first electrode 13 by a coating method, which is a roll-to-roll method, to compose a multilayer of the liquid crystal arranged with microcapsules, and the thickness of the layers of liquid crystal is 50-70 nm, and then a white reflective material is added on the non-liquid crystal surface of the second electrode to configure a flexible color display device.

In the layers of liquid crystal, the first liquid crystal microcapsule presents a transparent state at a heating temperature of 65° C., and turns into a misty state when a low frequency voltage of 130 V is applied; the second liquid crystal microcapsule presents a transparent state at a heating temperature of 50° C., and turns into a misty state when a low frequency voltage of 120 V is applied. A color display device with blue, red, atropurpureus and white can be realized by applying power to the whole surface of the first electrode and the second electrode and locally heating the flexible color display device by a thermal printer, in combination with different driving methods.

The driving method of the display area with the first color, in turn, is applying a voltage of 130 V, not applying a heating temperature of 65° C., applying a voltage of 120 V and applying a heating temperature of 50° C. When the driving is finished, the first liquid crystal microcapsule presents a misty state and the second liquid crystal microcapsule presents a transparent state, and the red light reflected by the first liquid crystal microcapsule is displayed.

The driving method of the display area with the second color, in turn, is applying a voltage of 130 V, applying a temperature of 65° C., applying a voltage of 120 V and not applying a heating temperature of 50° C. When the driving is finished, the first liquid crystal microcapsule presents a transparent state and the second liquid crystal microcapsule presents a misty state, and the blue light reflected by the second liquid crystal microcapsule is displayed.

The driving method of the display area with the third color, in turn, is applying a voltage of 130 V, not applying a temperature of 65° C., applying a voltage of 120 V and not applying a heating temperature of 50° C. When the driving is finished, the two kinds of microcapsules both are in a misty state, the red and blue lights reflected by the two kinds of microcapsules are superposed to show atropurpureus.

The driving method of the display area with the fourth color, in turn, is applying a voltage of 130 V, applying a temperature of 65° C., applying a voltage of 120 V and applying a heating temperature of 50° C. When the driving is finished, the two kinds of liquid crystal microcapsules both are in a transparent state, the dichroic dye molecules still have a certain light absorption property, and the white color close to the color of the reflective material is displayed. The accuracy of the color display is determined by the accuracy of the heated tips of the thermal printer.

While the preferred embodiments of the present invention have been described in detail above, the present invention is not limited to the specific details in the above embodiments. Within the scope of the technical concept of the present invention, various equivalent modifications may be made to the technical solution of the present invention, which are within the scope of the present invention.

It should also be noted that the specific technical features described in the above-mentioned embodiments may be combined in any suitable manner without contradiction. In order to avoid unnecessary duplication, the present invention will not describe the various possible combinations.

The invention claimed is:

1. A liquid crystal display device, comprising:
    an upper substrate and a lower substrate;
    one or more layers of an encapsulated liquid crystal sandwiched between said upper substrate and said lower substrate;
    said one or more layers of said encapsulated liquid crystal including a mixture of a first liquid crystal microcapsule and a second liquid crystal microcapsule uniformly distributed in the same layer;
    said first liquid crystal microcapsule having a first liquid crystal material which does not include a nematic liquid crystal, and includes a smectic liquid crystal, a conductive material and a first dye;

said second liquid crystal microcapsule having a second liquid crystal material which includes a smectic liquid crystal, a nematic liquid crystal, a conductive material and a second dye different in color from the first dye; and a first transparent electrode and a second transparent electrode disposed on sides of said upper and lower substrates, wherein each of the sides of said upper and lower substrates is adjacent to the liquid crystal layer, and the first and second transparent electrodes are opposed to each other to form a display area.

2. The liquid crystal display device according to claim 1, wherein the first dye comprises one or more dichroic dyes, and the second dye comprises one or more dichroic dyes.

3. The liquid crystal display device according to claim 1, wherein said conductive material is a mixture of any one or any of inorganic nanoparticles, carbon nanotubes, graphene, sodium carbonate, cetyltriethylammonium bromide, ethyltriphenylphosphonium iodide, (ferrocenylmethyl)trimethylammonium iodide, 1,2-dimethyl-3-butylimidazolium hexafluorophosphate, tetraethylammonium p-toluenesulfonate, phenyltriethylammonium iodide, 1-octyl-3-methylimidazolium hexafluorophosphate, bis(tetra-n-butylammonium) bis(1,3-dithiole-2-thione-4,5-dithiolato)palladium (11), tetra-n-butylphosphonium bis(1,3-dithiole-2-thione-4, 5-dithiolato)nickel(111), bis(tetra-n-butylammonium) bis(1, 3-dithiole-2-thione-4,5-dithiolato)zinc, bis(tetra-n-butylammonium) tetracyanodiphenoquinodimethane, tetrabutylammonium bromide, cetylammonium perchlorate, tetracetylammonium bromide, 1-butyl-3-methylimidazolium tetrachloroferrate, methyltriphenylphosphonium iodide or tetraphenylphosphonium iodide having conductive properties.

4. The liquid crystal display device according to claim 2, wherein the first liquid crystal material comprises the conductive material in an amount of 0.001%-10% and the first dye in an amount of 0.01-10% added to the smectic liquid crystal.

5. The liquid crystal display device according to claim 2, wherein the second liquid crystal material comprises the nematic liquid crystal in an amount of 1%-20% and the second dye in an amount of 0.01-10% added to the smectic liquid crystal.

6. The liquid crystal display device according to claim 1, wherein the layers of the encapsulated liquid crystal further comprise a gel material which comprises a UV glue, an animal glue, a plant gum, a microbial gum, polyvinyl alcohol or a combination thereof.

7. The liquid crystal display device according to claim 1, which further comprises a reflector disposed on either side of said lower substrate, and wherein a color of said reflector is different from a color of said first dye, a color of said second dye and a color of the mixture of said first and second dyes.

8. The liquid crystal display device according to claim 1, wherein both of said upper substrate and said lower substrate are transparent flexible plastic film or glass.

9. The liquid crystal display device according to claim 1, wherein said upper substrate is transparent flexible plastic film or glass, said lower substrate is flexible reflective material, and a color of said reflective material is different from the color of said first dye, the color of said second dye and the color of the mixture of said first and second dyes.

10. A method for driving the liquid crystal display device, the method comprising:
providing the liquid crystal display device according to claim 1;
applying sequentially a first voltage, a first temperature, a second voltage, and a second temperature, and thereby:
applying the first and second voltages between the first and the second transparent electrodes; and
applying the first and second temperatures to a whole area or a partial area of the display area by heating.

11. The method for driving the liquid crystal display device according to claim 10, wherein a display area with a first color is configured by applying the first voltage, not applying the first temperature, applying the second voltage and applying the second temperature.

12. The method for driving the liquid crystal display device according to claim 10, wherein a display area with a second color is configured by applying the first voltage, applying the first temperature, applying the second voltage and not applying the second temperature.

13. The method for driving the liquid crystal display device according to claim 10, wherein a display area with a third color is configured by applying the first voltage, not applying the first temperature, applying the second voltage, and not applying the second temperature.

14. The method for driving the liquid crystal display device according to claim 10, wherein a display area with a fourth color is configured by applying the first voltage, applying the first temperature, applying the second voltage, and applying the second temperature.

15. The liquid crystal display device according to claim 1, wherein said first liquid crystal microcapsule has a diameter from 15 to 20 μm.

16. The liquid crystal display device according to claim 1, wherein said second liquid crystal microcapsule has a diameter from 15 to 20 μm.

* * * * *